United States Patent
Zhang et al.

(10) Patent No.: US 11,324,007 B2
(45) Date of Patent: May 3, 2022

(54) METHOD AND DEVICE FOR TRANSMITTING DATA

(71) Applicant: Samsung Electronics Co., Ltd, Suwon-si (KR)

(72) Inventors: Shichang Zhang, Beijing (CN); Yingyang Li, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 16/497,332

(22) PCT Filed: Mar. 23, 2018

(86) PCT No.: PCT/KR2018/003420
§ 371 (c)(1),
(2) Date: Sep. 24, 2019

(87) PCT Pub. No.: WO2018/174630
PCT Pub. Date: Sep. 27, 2018

(65) Prior Publication Data
US 2020/0383114 A1 Dec. 3, 2020

(30) Foreign Application Priority Data

Mar. 24, 2017 (CN) .......................... 201710185965.6
May 5, 2017 (CN) .......................... 201710316249.7

(51) Int. Cl.
*H04W 72/04* (2009.01)
*H04B 17/318* (2015.01)
(Continued)

(52) U.S. Cl.
CPC ...... *H04W 72/0493* (2013.01); *H04B 17/318* (2015.01); *H04L 1/0003* (2013.01);
(Continued)

(58) Field of Classification Search
CPC ............... H04W 72/0493; H04W 4/40; H04W 72/0406; H04W 72/0446; H04W 72/0453;
(Continued)

(56) References Cited

U.S. PATENT DOCUMENTS

| 10,382,989 B2 | 8/2019 | Lee et al. |
| 2018/0220480 A1 | 8/2018 | Agiwal et al. |
| 2019/0075548 A1* | 3/2019 | Lee ..................... H04W 72/044 |

FOREIGN PATENT DOCUMENTS

| WO | 2016/195383 A1 | 12/2016 |
| WO | 2016/200221 A1 | 12/2016 |

OTHER PUBLICATIONS

"3rd Generation Partnership Project; Technical Specification Group Radio Access Network; Evolved Universal Terrestrial Radio Access (E-UTRA); Physical layer procedures (Release 14)", 3GPP TS 36.213 V14.2.0 (Mar. 2017), 64 pages.

(Continued)

*Primary Examiner* — Habte Mered
*Assistant Examiner* — Nevena Zecevic Sandhu

(57) ABSTRACT

A data transmission method, by a first UE is provided. The method includes detecting, on one or more carriers, a Physical Sidelink Control Channel (PSCCH) transmitted by a second UE, compensating, on each of the carriers, a Physical Sidelink Shared Channel's Demodulation Reference Signal Receiving Power (PSSCH-RSRP) of the second UE according to the detected PSCCH, determining, on each of the carriers, available candidate single-subframe resources according to the compensated PSSCH-RSRP, and transmitting the Physical Sidelink Shared Channel (PSSCH) using at least one of the available candidate single-subframe resources determined on all of the carriers.

11 Claims, 3 Drawing Sheets

(51) Int. Cl.
  *H04W 4/40*  (2018.01)
  *H04L 1/00*  (2006.01)
  *H04L 5/00*  (2006.01)
  *H04L 5/10*  (2006.01)
  *H04W 72/12*  (2009.01)
  *H04W 74/08*  (2009.01)
  *H04W 92/18*  (2009.01)

(52) U.S. Cl.
  CPC .............. *H04L 5/0051* (2013.01); *H04L 5/10* (2013.01); *H04W 4/40* (2018.02); *H04W 72/0406* (2013.01); *H04W 72/0446* (2013.01); *H04W 72/0453* (2013.01); *H04W 72/1263* (2013.01); *H04W 74/0808* (2013.01); *H04W 92/18* (2013.01)

(58) Field of Classification Search
  CPC ......... H04W 72/1263; H04W 74/0808; H04W 92/18; H04B 17/318; H04L 1/0003; H04L 5/0051; H04L 5/10
  See application file for complete search history.

(56) References Cited

OTHER PUBLICATIONS

Ericsson, "Discussion on PC5 Multi-Carrier", 3GPP TSG-RAN WG2 #97, Feb. 13-17, 2017, Tdoc R2-1700932, 4 pages.
Huawei, HiSilicon, "On carrier selection for multi-carrier operation", 3GPP TSG RAN WG2 Meeting #97, Feb. 13-17, 2017, R2-1701367, 2 pages.
International Search Report dated Jul. 27, 2018 in connection with International Patent Application No. PCT/KR2018/003420, 3 pages.
Written Opinion of the International Search Authority dated Jul. 27, 2018 in connection with International Patent Application No. PCT/KR2018/003420, 6 pages.

* cited by examiner

[Fig. 1]
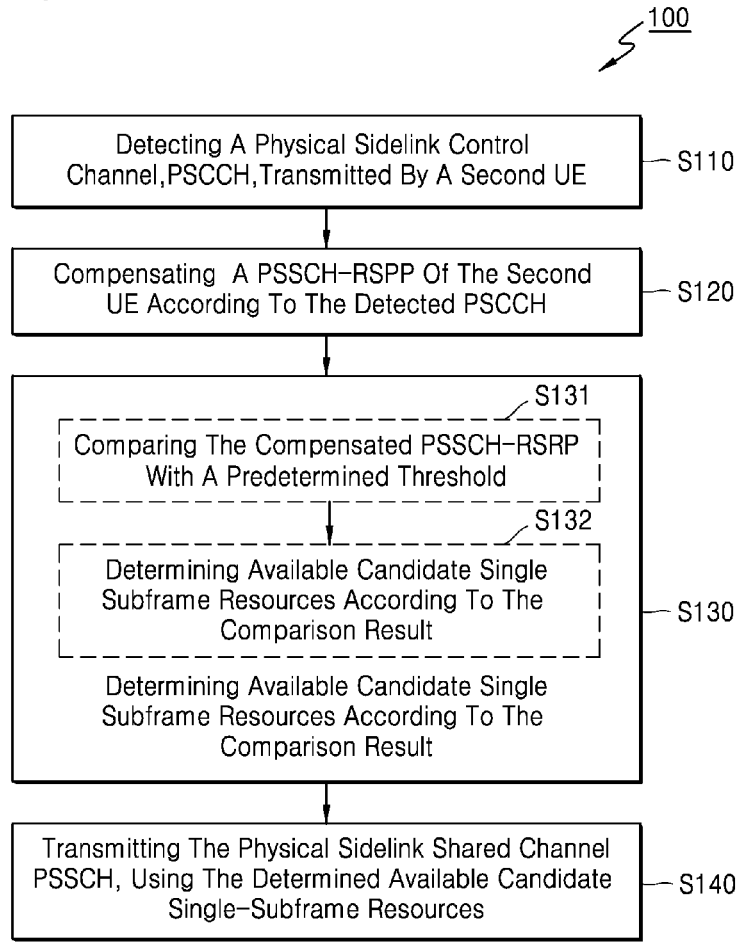
[Fig. 2]
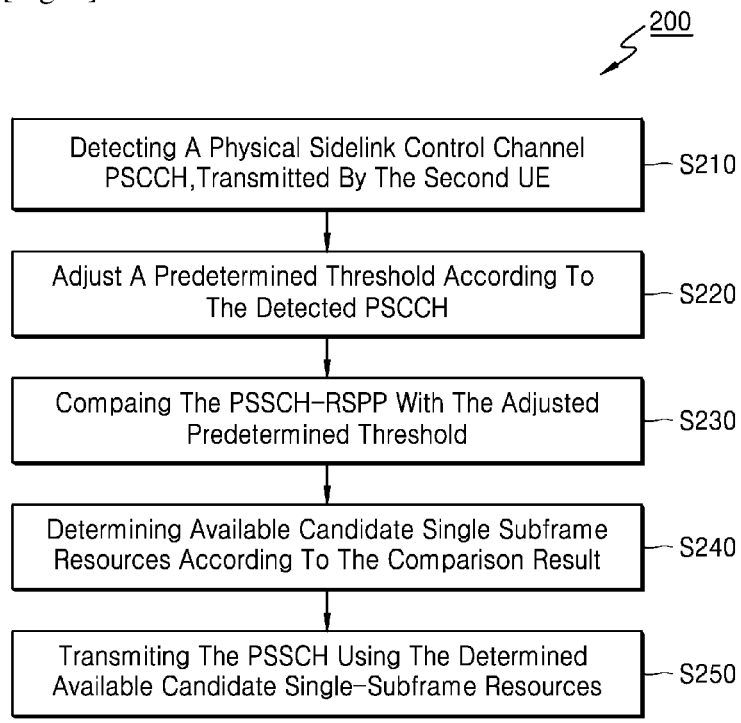

[Fig. 3]
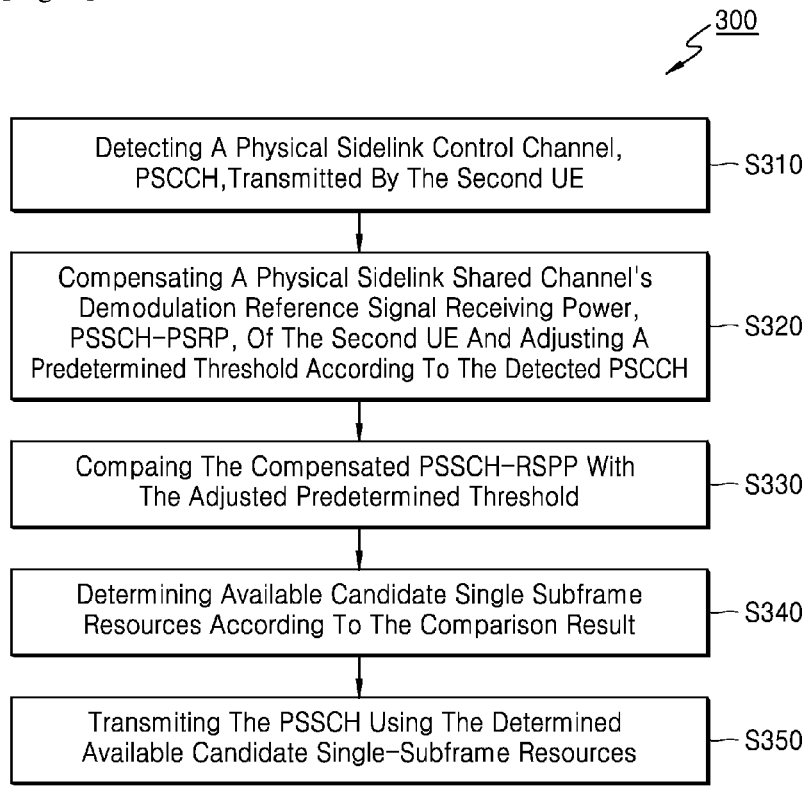
[Fig. 4]
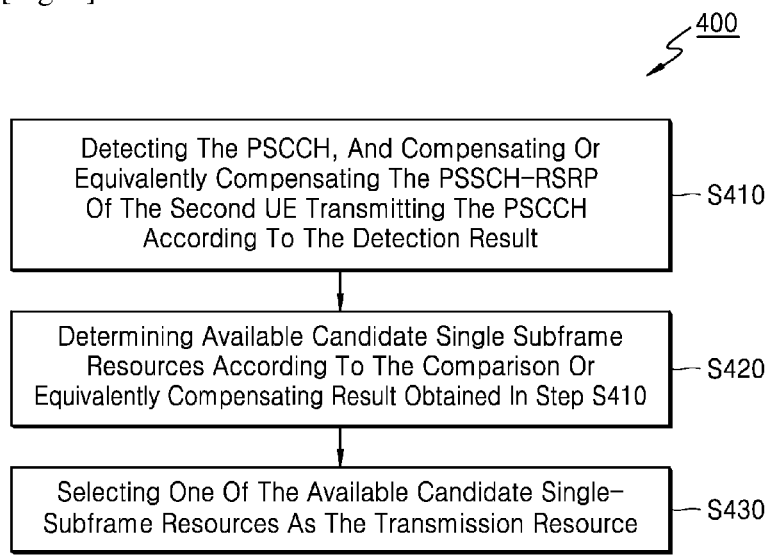

[Fig. 5]
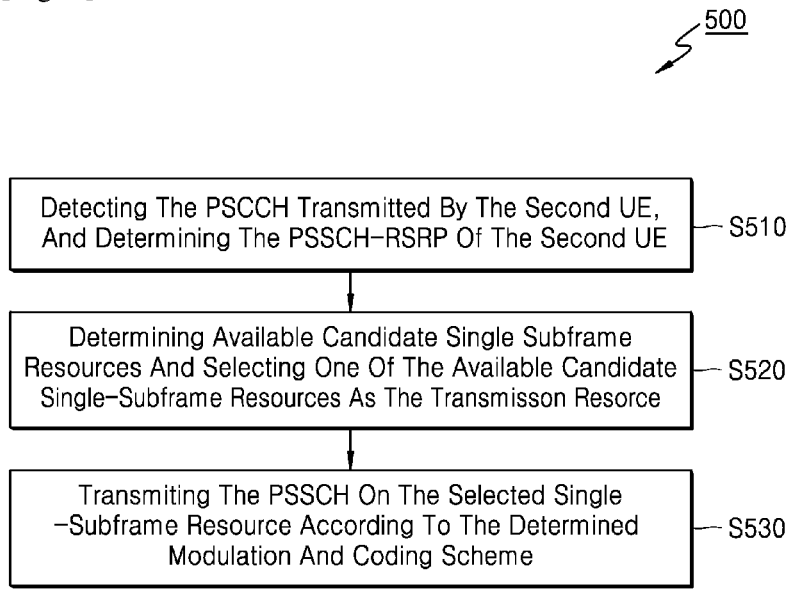
[Fig. 6]
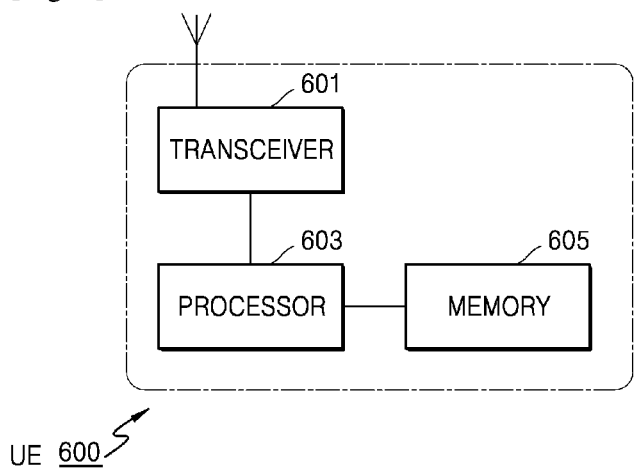

METHOD AND DEVICE FOR TRANSMITTING DATA

CROSS-REFERENCE TO RELATED APPLICATIONS

This application is a 371 of International Application No. PCT/KR2018/003420 filed on Mar. 23, 2018, which claims priority to Chinese Patent Application No. 201710185965.6 filed on Mar. 24, 2017, and Chinese Patent Application No. 201710316249.7 filed on May 5, 2017, the disclosures of which are herein incorporated by reference in their entirety.

BACKGROUND

1. Field

The present disclosure relates to the field of communication technology. In particular, it relates to a data transmission method, e.g. in a V2X communication and a corresponding user equipment.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, V2X(Vehicle to Vehicle/Pedestrian/Infrastructure/Network) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, V2X and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

There is a need to reduce a minimum data transmission delay in the V2X communication and to adopt a multi-antenna transmission technology, in order to support applications with more demanding latency requirements while increasing a success rate of data reception in the V2X communication.

SUMMARY

Embodiments of the present disclosure provide a data transmission method performed at a first UE and a corresponding first UE. The method comprises: detecting, on one or more carriers, a Physical Sidelink Control Channel (PSCCH) transmitted by a second UE; compensating, on each of the carriers, a Physical Sidelink Shared Channel's Demodulation Reference Signal Receiving Power (PSSCH-RSRP) of the second UE according to the detected PSCCH; determining, on each of the carriers, available candidate single-subframe resources according to the compensated PSSCH-RSRP; and transmitting the Physical Sidelink Shared Channel (PSSCH) using at least one of the available candidate single-subframe resources determined on all of the carriers. Embodiments of the present disclosure also provide two other methods performed at the first UE and a corresponding first UE.

By the method of the present application, the minimum data transmission delay in the V2X communication is reduced and the applications demanding more latency requirements are supported.

BRIEF DESCRIPTION OF THE DRAWINGS

The foregoing and/or additional aspects and advantages of the present disclosure will become apparent and readily understood from the following description of the embodiments taken in conjunction with the accompanying drawings in which:

FIG. 1 shows a schematic flow diagram of a data transmission method 100 performed at a first UE according to an exemplary embodiment of the present disclosure;

FIG. 2 shows a schematic flow diagram of a data transmission method 200 performed at a first UE according to an exemplary embodiment of the present disclosure;

FIG. 3 shows a schematic flow diagram of a data transmission method 300 performed at a first UE according to an exemplary embodiment of the present disclosure;

FIG. 4 shows a schematic flow diagram of a data transmission method 400 performed at a first UE according to an embodiment of the present disclosure;

FIG. 5 shows a schematic flow diagram of a data transmission method 500 performed at a first UE according to an embodiment of the present disclosure;

FIG. 6 shows a schematic block diagram of a UE 600 according to an embodiment of the present disclosure.

DETAILED DESCRIPTION

In order to solve the above problems, the present disclosure proposes to reduce the likelihood that the resources for the second type V2X UE employing the multi-antenna transmission are preempted by compensating the PSSCH-RSRP of such a UE.

In particular, according to a first aspect of the present disclosure, a data transmission method performed at a first user equipment UE is provided. The method is performed at the first user equipment (UE). The method comprises: detecting, on one or more operating carriers, a Physical Sidelink Control Channel (PSCCH) transmitted by a second UE; compensating, on each of the operating carriers, a Physical Sidelink Shared Channel's Demodulation Reference Signal Receiving Power (PSSCH-RSRP) of the second UE according to the detected PSCCH; determining, on each of the operating carriers, available candidate single-subframe resources according to the compensated PSSCH-RSRP; and transmitting the Physical Sidelink Shared Channel (PSSCH) using at least one of the available candidate single-subframe resources determined on the one or more operating carriers.

In some embodiments, the detected PSCCH comprises at least one of: an indication for indicating that the second UE employs the multi-antenna transmission; or an indication of compensating the PSSCH-RSRP of the second UE.

In some embodiments, determining, on each of the operating carriers, available candidate single-subframe resources according to the compensated PSSCH-RSRP comprises: determining, on each of the carriers, a certain percentage of the single-subframe resources within a resource selection window as the candidate single-subframe resources.

In some embodiments, transmitting the PSSCH using at least one of the determined available candidate single-subframe resources comprises: selecting an initial index m for a modulation coding scheme (MC S); determining an index m' for an effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein a value of d is configured by a base station or preconfigured; and transmitting the PSSCH on at least one of the determined available candidate single-subframe resources according to the determined transport block size index and modulation order.

In some embodiments, transmitting the PSSCH using the determined available candidate single-subframe resources comprises: selecting an initial index m for a modulation coding scheme (MCS); determining a transport block size index according to m and a predetermined mapping rule between MCS indexes and transport block size indexes, and determining a modulation order Q' according to m and a predetermined mapping rule between MCS indexes and modulation orders; and transmitting data on the determined available candidate single-subframe resources according to the determined transport block size index and Q, wherein Q=max (4, Q').

In some embodiments, the second UE supports the multi-antenna transmission.

In some embodiments, determining, on each of the carriers, available candidate single-subframe resources according to the compensated PSSCH-RSRP comprises: comparing the compensated PSSCH-RSRP with a predetermined threshold; and determining the candidate single-subframe resources according to the comparison result.

In some embodiments, the first UE and the second UE are V2X devices that communicate directly with each other through a Sidelink connection.

According to a second aspect of the present disclosure, a data transmission method performed at a first user equipment UE is provided. The method is performed at the first user equipment (UE). The method comprises: detecting, on one or more carriers, a Physical Sidelink Control Channel (PSCCH) transmitted by a second UE; adjusting, on one or more carriers, a predetermined threshold according to the detected PSCCH and comparing PSSCH-RSRP with the adjusted predetermined threshold; determining, on each of the carriers, available candidate single-subframe resources according to the comparison result; and transmitting the Physical Sidelink Shared Channel (PSSCH) using at least one of the determined available candidate single-subframe resources.

In some embodiments, the detected PSCCH comprises a priority offset indication for indicating an offset between an actual priority of the data transmission of the second UE and a transmitted priority of the data to be scheduled of the second UE. In addition, adjusting the predetermined threshold according to the detected PSCCH comprises adjusting the predetermined threshold according to the priority offset indication.

In some embodiments, determining, on each of the operating carriers, available candidate single-subframe resources according to the compensated PSSCH-RSRP comprises: determining, on each of the carriers, a certain percentage of the single-subframe resources within a resource selection window as the candidate single-subframe resources.

In some embodiments, transmitting the PSSCH using at least one of the determined available candidate single-subframe resources comprises: selecting an initial index m for a modulation coding scheme (MCS); determining an index m' for an effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein a value of d is configured by a base station or preconfigured; and transmitting the PSSCH on at least one of the determined available candidate single-subframe resources according to the determined transport block size index and modulation order.

In some embodiments, transmitting the PSSCH using at least one of the determined available candidate single-subframe resources comprises: selecting an initial index m for a modulation coding scheme (MCS); determining a transport block size index according to m and a predetermined mapping rule between MCS indexes and transport block size indexes, and determining a modulation order Q' according to m and a predetermined mapping rule between MCS indexes and modulation orders; and transmitting the PSSCH on the determined available candidate single-subframe resources according to the determined transport block size index and Q', wherein Q=max (4, Q').

In some embodiments, the second UE supports multi-antenna transmission.

In some embodiments, the first UE and the second UE are V2X devices that communicate directly with each other through a Sidelink connection.

According to a third aspect of the present disclosure, a data transmission method performed at a first user equipment UE is provided. The method is performed at the first user equipment (UE). The method comprises: detecting, on one or more carriers, a Physical Sidelink Control Channel (PSCCH) transmitted by a second UE; on each of operating carriers, compensating the PSSCH-RSRP and adjusting a predetermined threshold according to the detected PSCCH; comparing, on each of the operating carriers, the compensated PSSCH-RSRP with the adjusted predetermined threshold; determining, on each of the operating carriers, available candidate single-subframe resources according to the comparison result; and transmitting the Physical Sidelink Shared Channel (PSSCH) using at least one of the available candidate single-subframe resources determined on the one or more operating carriers.

In some embodiments, compensating the PSSCH-RSRP according to the detected PSCCH comprises compensating the PSSCH-RSRP according to at least one of: an indication for indicating that the second UE employs the multi-antenna transmission; or an indication of compensating the PSSCH-RSRP of the second UE.

In some embodiments, the detected PSCCH comprises a priority offset indication for indicating an offset between an actual priority of the data transmission of the second UE and a transmitted priority of the data to be scheduled of the second UE. In addition, adjusting the predetermined threshold according to the detected PSCCH comprises adjusting the predetermined threshold according to the priority offset indication.

According to a fourth aspect of the present disclosure, a first user equipment (UE) is provided. The first UE comprises: a transceiver; a processor; and a memory storing computer-executable instructions that, when executed by the processor, cause the first UE to perform a method according to any of the first, second, and third aspects.

According to a fifth aspect of the present disclosure, a computer storage medium storing computer-executable instructions is provided. The computer-executable instructions cause a first user equipment (UE) to perform the method according to any of the first, second, and third aspects when they are executed by a processor of the first UE.

According to the above-described embodiments of the present disclosure, the present disclosure provides a new UE (as described above, also referred to as a second type V2X UE, which supports both the single-antenna transmission and the multi-antenna transmission) with respect to the first type V2X UE, and a data transmission method performed at the new UE which can improve the performance of the V2X communication system with a small modification to the standards. In particular, the new UE determines that a second type V2X UE (e.g., a second type V2X UE employing the multi-antenna transmission) employs the multi-antenna transmission according to the PSCCH of the UE detected on one or more operating carriers, and then compensates or equivalently compensates the PSSCH-RSRP of the UE (e.g. adjusts a predetermined threshold for comparison with the PSSCH-RSRP when determining available candidate resources), thereby reducing the likelihood that the transmission resources for the second type V2X UE employing the multi-antenna transmission are occupied. In addition, when the data transmission of the new UE requires small latency and thus requires a reduced resource selection window, the new UE may adopt a more advanced modulation and coding scheme to reduce the required single-subframe resources, adopt means such as increasing the proportion of the potential candidate single-subframe resources, employing the multi-carrier resource selection and other things to increase the amount of the available candidate single-subframe resources within the resource selection window, so as to avoid the possibility of different UEs selecting a same resource.

Hereinafter, embodiments of the present disclosure are explained in details. Examples of the embodiments are shown in the accompanying drawings, wherein like or similar reference numerals refer to like or similar elements or elements having the same or similar functions. The embodiments described below with reference to the accompanying drawings are illustrative and only for the purpose of explaining the present disclosure, and should not be construed as limiting the present disclosure.

It will be understood by those skilled in the art that the singular forms "a", "an", "the" and "said" used herein may also comprise the plural forms, unless specifically stated otherwise. It should be further understood that the phrase "comprise" and "include" used in the specification of the present disclosure refers to the existence of the features, integers, steps, operations, elements and/or components, but does not exclude preclude the existence or addition of one or more other features, integers, steps, operations, elements, components, and/or their combination. It should be understood that, when it recites that an element is "connected" or "coupled" to another element, the element may be connected or coupled to the another element directly or via intermediate elements. In addition, "connecting" or "coupling" used herein used herein may include a wireless connection or wireless coupling. The phrase "and/or" used herein includes the whole, or any of, or any combination of the one or more associated listed items.

It will be understood by those skilled in the art that all terms (including technical and scientific terms) used herein, unless otherwise defined, have the same meaning as the general understanding of the ordinary skilled in the art to which this disclosure belongs. It should also be understood that terms, such as those defined in the general dictionary, should be understood to have the same meaning as that in the context of the prior art and, unless specifically defined, would not be explained as idealized or too formal meaning.

It will be understood by those skilled in the art that the term "user equipment" or "UE" used herein comprises not only a device which has only wireless signal receiving capability and no wireless signal transmitting capability, but also a device comprising transmitting hardware and receiving hardware which is capable of performing bidirectional communications over bidirectional communication links. Such a device may comprise: a cellular or other communication device with a single-line display or a multi-line display, or a cellular or other communication device without a multi-line display; a PCS (Personal Communications Service), which can combine voice, data Processing, facsimile and/or data communication capabilities; a PDA (Personal Digital Assistant), which may include a radio receiver, a pager, an Internet/Intranet access, a web browser, a notebook, a calendar, and/or a GPS (Global Positioning System) receiver; a conventional laptop and/or palmtop computer, or other device that comprises the conventional laptop and/or palmtop computer. The "user equipment" and "UE" used herein may be portable, transportable, installed in a vehicle (air, maritime and/or land), or suitable for and/or configured for operating locally and/or running in a distributed form in any other sites on Earth and/or Space. The "user equipment" and "UE" used herein may refer to a communication terminal, an Internet terminal, a music/video playback terminal, such as a PDA, a MID (Mobile Internet Device), and/or a mobile phone with a music/video player function, as well as a smart TV, a set-top box and other equipment.

In the 3GPP standard, a direct communication link between a device and another one is called a Sidelink. Similar to an uplink/downlink, the Sidelink comprises a control channel and a data channel. The former is called a Physical Sidelink Control CHannel (referred to as a PSCCH), and the latter is called a Physical Sidelink Shared CHannel (referred to as a PSSCH). The PSCCH is used to indicate a time-frequency domain resource location of the PSSCH transmission, a modulation and coding scheme, and a priority of the data carried in the PSSCH, and so on. The PSSCH is used to carry data.

Control information and Data in the Vehicle to Vehicle/Pedestrian/Infrastructure/Network (referred to as V2X) can be transmitted by the Sidelink. At this point, the V2X communication includes two transmission modes, i.e. transmission mode 3 (Mode 3) and transmission mode 4 (Mode 4). In Mode 3, the transmission resources for the PSCCH and PSSCH of a UE (referring to a V2X UE herein) are both allocated by an evolved Node B (referred to as eNB). The UE determines the transmission resources for the PSCCH and the PSSCH by receiving the Sidelink Resource Allocation Indication send by the eNB over the PDCCH or EPDCCH. In Mode 4, the transmission resources for the PSCCH and the PSSCH are autonomously selected by the UE according to the channel detection result. If a UE employing the Mode 4 has V2X data to be transmitted in the subframe n (i.e., a V2X packet arrives at the Radio Access Layer of the UE at a time no later than the subframe n) and the condition for resource selection or reselection is satisfied, the UE will select the time-frequency resource within the resource selection window [n+T1, n+T2] as candidate single-subframe resources (the values of T1 and T2 are determined by the UE, and shall satisfy T1≤4, 20≤T2≤100). Then, the UE determines available candidate single-subframe resources within the resource selection window. In the process of determining the available candidate single-subframe resources, the UE first determines the time-frequency resource location and priority of the scheduled PSSCH by receiving the PSCCH transmitted by other UEs, then further detects the scheduled PSSCH's Demodulation Reference Signal Receiving Power (PSSCH-RSRP), next excludes the PSSCH-RSRP higher than a predetermined threshold (hereinafter referred to as Resource Selection Step 2), and afterword calculates the average received energy (S-RSSI) of the remaining resources, X % of the single-subframe resources with the lowest S-RSSI being the available candidate single-subframe resources (hereinafter referred to as Resource Selection Step 3). In the 3GPP Rel-14 standard, the value of X is 20. It is to be noted that the X % is a ratio of the available candidate single-subframe resources to all single-subframe resources within the resource selection window. The UE will randomly select a resource as the transmission resource from the available candidate single-subframe resources.

In the 3GPP standard of 3GPP Rel-14, V2X communication can support a minimum data transmission delay of 20 ms. However, this delay cannot meet the needs for all application scenarios of the V2X communication. For example, in the Platooning application scenario, some packets require a transmission delay no more than 10 ms. For this reason, the minimum value of T2 should be no more than 10 when determining the resource selection window in the resource selection or reselection process, so that the interval between the selected resource and the execution time for the resource selection or reselection does not exceed the delay requirement for the data transmission. However, if there are multiple UEs simultaneously performing resource selection or reselection at subframe n, the reduced resource selection window will cause an increased likelihood of the UEs selecting a same resource, resulting in a decrease in V2X system performance.

In addition, the current V2X communication has not adopted multi-antenna technology, so 3GPP Rel-14 V2X device (called the first type V2X UE) only use single-antenna transmission. However, in order to further improve the data reception success rate in V2X communication, multi-antenna technology is a very necessary choice. In order to ensure backward compatibility (e.g., coexistence of the first type V2X UE with the V2X device of LTE Rel-15 or future Releases (referred to as a second type V2X UE, either employing multi-antenna transmission or employing the single-antenna transmission). During the next evolution of V2X, the second type V2X UE employing the multi-antenna transmission and the UE employing only the single-antenna transmission (including the first type V2X UE and the second type V2X UE employing the single-antenna transmission) may operate in a same resource pool. However, the transmission power of each transmission antenna in the multi-antenna transmission by a UE will be lower than the transmission power in the single-antenna transmission. According to the channel detection mode of the current 3GPP Rel-14 UE, the PSSCH-RSRP of the second type V2X UE employing the multi-antenna transmission detected by the first type V2X UE is also lower than the detected PSSCH-RSRP of the UE employing the single-antenna transmission (including the first type V2X UE and the second type V2X UE employing the single-antenna transmission) in a same state, so that the resource for the second type V2X UE employing the multi-antenna transmission is easier to be preempted by the first type V2X UE, and eventually the application of the multi-antenna technology in the V2X communication affecting.

Through the above analysis, it can be seen that there is a need to reduce the minimum data transmission delay in the V2X communication and to adopt the multi-antenna transmission technology, in order to support applications with more demanding latency requirements while increasing the success rate of data reception in the V2X communication. However, for the resulting problems, no ideal solution has been provided.

In order to support applications with more demanding latency requirements while increasing the success rate of data reception, there is a need to further reduce the minimum delay supported by the V2X system and further support the multi-antenna transmission technology. In this case, the present disclosure proposes a direct communication method, in order to avoid increasing the probability of resource collision between different UEs (e.g., the first type V2X UE and the second type V2X UE employing the multiple antenna transmission) while reducing the likelihood that the resources for the second type V2X UE employing the multi-antenna transmission are preempted by a backward UE (e.g., a first type V2X UE).

FIG. 1 shows a schematic flow diagram of a data transmission method 100 performed at a first UE according to an exemplary embodiment of the present disclosure. The first UE may communicate directly with the second UE. The first UE and the second UE may be, for example, V2X devices (i.e., V2X UEs) that communication directly with each other through a Sidelink connection. For example, the first UE may be a second type V2X UE that may employ the single-antenna transmission or employ the multi-antenna transmission. Hereafter, the scenario of V2X communication will be taken as an example to explain the exemplary embodiments of the present disclosure. However, it should be understood that the method 100 may be applied to direct communications between any two of UEs.

In step S110, the first UE detects a Physical Sidelink Control CHannel (PSCCH) transmitted by the second UE on one or more carriers. The detected PSCCH may contain information of a priority of data transmission of the second UE and a resource reservation interval of the second UE, etc.

In one exemplary embodiment, the UE may detect the PSCCH transmitted by the second UE on only one carrier. If the UE has only one selectable carrier, the carrier is the current operating carrier of the UE.

Otherwise, the carrier is selected by the UE among a plurality of selectable carriers. An optional selection is that the carrier may be randomly selected by the UE with an equal probability among the plurality of selectable carriers. Another optional selection is that the carrier is randomly selected by the UE according to a carrier-specific probability, Pc, where Pc is the probability of the carrier c being selected by the UE. Preferably, Pc is a function of the channel occupancy ratio (CBRc) on the carrier c and the CBRs on the plurality of selectable carriers, for example, $$P_c = \frac{1/CBR_c}{\sum_{i=0}^{i=N-1} 1/CBR_i},$$

wherein N is the number of the selectable carriers, CBRi is the CBR on the i-th carrier, c=0, 1, 2, ... N−1. A further optional selection is that the carrier is randomly selected by the UE with an equal probability among m of the plurality of selectable carriers that have lowest CBRs, where 1≤m≤N. The UE determines the value of m according to an indication signaled by the eNB, pre-configuration, or a standard definition.

In one exemplary embodiment, the UE may detect the PSCCH transmitted by the second UE on each of the selectable carriers.

In one exemplary embodiment, the detected PSCCH comprises: an indication for indicating that the second UE employs the multi-antenna transmission; or an indication of compensating the PSSCH-RSRP of the second UE.

In step S120, the first UE compensates a PSSCH-RSRP of the second UE according to the detected PSCCH. The first UE may compensate the PSSCH-RSRP of the second UE if the detected PSCCH comprises an indication for indicating that the second UE employs the multi-antenna transmission or an indication of compensating the PSSCH-RSRP of the second UE. That is, in the case where the second UE is a second type V2X UE employing the multi-antenna transmission, the first UE may compensate the PSSCH-RSRP of the second UE.

In step S130, the first UE determines available candidate single-subframe resources according to the comparison result.

In an exemplary embodiment, step S130 may comprise comparing the compensated PSSCH-RSRP with a predetermined threshold (step S131); and determining the available candidate single-subframe resources according to the comparison result (step S132).

Step S130 may be performed in accordance with the resource selection step 2 and the resource selection step 3 in the existing standards, except that the PSSCH-RSRP is compensated. In particular, exclusion of corresponding single-subframe resources may be performed according to the comparison result of the compensated PSSCH-RSRP with the predetermined threshold. For example, the single-subframe resources with a PSSCH-RSRP higher than a predetermined threshold may be excluded, and then X % of the single-subframe resources with the lowest S-RSSI in the remaining resources may be taken as the available candidate single-subframe resources.

In the resource selection step 2 and the resource selection step 3 in the existing standard, it also requires the information indicated by an upper layer of the first UE (referred to as the upper layer instruction information).

The upper layer indication information may comprise one or more of the following: one or more carriers selected by the UE's upper layer, a resource reservation interval $P_{rsvp\_TX}$ assumed when determining available candidate single-subframe resources on each carrier, the number $L_{subCH}$ of subchannels contained in a single-subframe resource assumed when determining available candidate single-subframe resources on each carrier, data transmission priority $prio_{TX}$ assumed when determining available candidate single-subframe resources on each carrier, and etc.

Here, the single-subframe resource $R_{x,y}$ is $L_{subCH}$ is consecutive subchannels starting from the subchannel x on the subframe $t_y^{SL}$, where y represents a relative index of the subframe $t_y^{SL}$ in the resource pool.

If the first UE performs resource reselection in subframe n, the first UE shall treat $L_{subCH}$ consecutive subchannels in any subframe belonging to the resource pool within the resource selection window [n+T$_1$, n+T$_2$] on one or more carriers as a candidate single-subframe resource, wherein T$_1$ and T$_2$ depends on the UE implementation, and 0<T$_1$≤a, b≤T$_2$≤c. The first UE may determine the values of a, b, and c according to a configuration from the base station, pre-configuration, or a standard definition. Preferably, if $P_{rsvp\_TX}$ is less than a specific value, the value of b should not be greater than $M_{rsvp\_TX}$. The total number of the single-subframe resources on a single carrier is denoted as $M_{total}$. The set of $M_{total}$ candidate single-subframe resources is denoted as S. It should be noted that the values of $M_{total}$ on different carriers may be different.

Preferably, the value of $L_{subCH}$ indicated by the upper layer should be within a certain range defined by the standard and configured by the base station or preconfigured. If $L_{subCH}$ is less than a specific value, e.g. 20, the certain range is less than the selectable range for $L_{subCH}$ in the same situation defined in 3GPP Rel-14. If $P_{rsvp\_TX}$ is less than a specific value, e.g. 20, and the UE currently detects the PSCCH transmitted by the second UE on only one carrier, the ratio X % of the finally determined available candidate single-subframe resources to all single-subframe resources within the resource selection window may be greater than the value defined in 3GPP Rel-14, i.e. 20%, thereby reducing the likelihood that different UEs select a same resource. If the UE currently detects the PSCCH transmitted by the second UE on a plurality of carriers, the ratio X % of the available candidate single-subframe resources finally determined by the UE on the carrier c (c=0, 1, 2, ... N−1, N is the number of carriers currently selected by the UE) to all single-subframe resources within the resource selection window may be equal to 20%×Rc, wherein Rc may be equal to 1, 1/N or Pc. The specific value of Rc may be configured by the eNB, preconfigured, or defined by the standard, which may better balance the quality of the available candidate resources and the resource collision probability.

In step S140, the first UE transmits the Physical Sidelink Shared Channel, PSSCH, using at least one of the determined available candidate single-subframe resources.

If the UE currently detects the PSCCH transmitted by the second UE on only one carrier, the first UE may randomly select with an equal probability, among the determined available candidate single-subframe resources, a single-subframe resource for transmitting the PSSCH.

If the UE currently detects the PSCCH transmitted by the second UE on a plurality of carriers, according to one aspect of the present disclosure, the UE may randomly select with an equal probability, among all the finally determined available candidate single-subframe resources on all carriers, a single-subframe resource for transmitting the PSSCH.

If the UE currently detects the PSCCH transmitted by the second UE on a plurality of carriers, according to another aspect of the present disclosure, the UE may first select one carrier c ($0 \leq c \leq N-1$) among the plurality of carriers, then randomly select with an equal probability, among the available candidate single-subframe resources on the carrier c, a single-subframe resource for transmitting the PSSCH. The UE may select the carrier c according to a carrier-specific probability Sc, where Sc may be 1/N or Pc. The specific value of Sc may be configured by the eNB, preconfigured, or defined by the standard.

If the UE currently detects the PSCCH transmitted by the second UE on a plurality of carriers, according to yet another aspect of the present disclosure, the UE selects the carrier c ($0 \leq c \leq N-1$) according to channel qualities of the available candidate single-subframe resources on respective carriers. The channel quality of the available candidate single-subframe resources may be at least one of the following information: the average S-RSSI on the available candidate single-subframe resources estimated by the UE, the data transmission priority for the UE occupying each of the subchannels on the available candidate single-subframe resources estimated by the UE, the PSSCH-RSRP for the UE occupying each of the subchannels on the available candidate single-subframe resources estimated by the UE, the resource reservation interval for the UE occupying each of the subchannels on the available candidate single-subframe resources estimated by the UE, and etc. Preferably, in order to support the above operations, the physical layer of the UE should report at least one of the above information to the upper layer.

The MCS may be selected by the first UE within a certain range. Here, the certain range is defined by the standard and is configured by the base station or preconfigured. Preferably, if $P_{rsvp\_TX}$ is less than a specific value, e.g. 20, the certain range is less than the selectable range for MCS in the same situation defined in 3GPP Rel-14. Alternatively, the selectable ranges for the MCS are same, while, for the same MCS value, the modulation order used by the first UE is higher than the modulation order defined in 3GPP Rel-14 corresponding to the MCS value.

In an exemplary embodiment, step S140 comprises: selecting an initial index m for the modulation coding scheme, MCS; determining an index m' for the effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein the value of d is configured by the base station or preconfigured; and transmitting the PSSCH on the determined available candidate single-subframe resources according to the determined transport block size index and modulation order.

In another exemplary embodiment, step S140 comprises: selecting an initial index m for the modulation coding scheme, MCS; determining a transport block size index according to m and a predetermined mapping rule between MCS indexes and transport block size indexes, and determining a modulation order Q' according to m and a predetermined mapping rule between MCS indexes and modulation orders; and transmitting data on the determined available candidate single-subframe resources according to the determined transport block size index and Q, wherein Q=max (4, Q').

FIG. 2 shows a schematic flow diagram of a data transmission method 200 performed at a first UE according to an exemplary embodiment of the present disclosure. The first UE may communicate directly with the second UE. The first UE and the second UE may be, for example, V2X devices (i.e., V2X UEs) that communication directly with each other through a Sidelink connection. For example, the first UE may be a second type V2X UE that may employ the single-antenna transmission or employ the multi-antenna transmission. Hereafter, the scenario of V2X communication will be taken as an example to explain the exemplary embodiments of the present disclosure. However, it should be understood that the method 200 may be applied to direct communications between any two of UEs.

In step S210, the first UE detects a Physical Sidelink Control CHannel (PSCCH) transmitted by the second UE on one or more carriers. The detected PSCCH may contain information of the priority of data transmission of the second UE and the resource reservation interval of the second UE and etc.

In one exemplary embodiment, the UE may detect the PSCCH transmitted by the second UE on only one carrier. If the UE has only one selectable carrier, the carrier is the current operating carrier of the UE.

Otherwise, the carrier is selected by the UE among a plurality of selectable carriers. An optional selection is that the carrier may be randomly selected by the UE with an equal probability among the plurality of selectable carriers. Another optional selection is that the carrier is randomly selected by the UE according to a carrier-specific probability, Pc, where Pc is the probability of the carrier c being selected by the UE. Preferably, Pc is a function of the channel occupancy ratio (CBRc) on the carrier c and the CBRs on the plurality of selectable carriers, for example, $$P_c = \frac{1/CBR_c}{\sum_{i=0}^{i=N-1} 1/CBR_i},$$

wherein N is the number of the selectable carriers, CBRi is the CBR on the i-th carrier, c=0, 1, 2, . . . N−1. A further optional selection is that the carrier is randomly selected by the UE with an equal probability among m of the plurality of selectable carriers that have lowest CBRs, where 1≤m≤N. The UE determines the value of m according to an indication signaled by the eNB, pre-configuration, or a standard definition.

In one exemplary embodiment, the UE may detect the PSCCH transmitted by the second UE on each of the selectable carriers.

In step S220, the first UE adjusts a predetermined threshold according to the detected PSCCH.

In one exemplary embodiment, the detected PSCCH comprises a priority offset indication. The priority offset indication is used to indicate an offset between the actual priority of the data transmission of the second UE and the transmitted priority of the data to be scheduled of the second UE. Accordingly, step S220 may comprise adjusting the predetermined threshold according to the priority offset indication.

In step S230, the first UE compares the PSSCH-RSRP with the adjusted predetermined threshold.

Step S230 is similar to S131, and may also be performed in accordance with the resource selection step 2 in the existing standards. The main difference between the two steps is that: in step 131 is the PSSCH-RSRP compensated, and in S230 is the predetermined threshold adjusted. That is, PSSCH-RSRP is directly compensated in step S131, while it is equivalently compensated by adjusting the predetermined threshold in step S230. Therefore, the manner of adjusting the predetermined threshold used in determining the available candidate resource may also be referred to as the equivalent compensation for the PSSCH-RSRP.

In step S240, the first UE determines, on each of the carriers, available candidate single-subframe resources according to the comparison result. Step S240 is similar to S132, and may also be performed in accordance with the resource selection step 2 and the resource selection step 3 in the existing standards. In particular, exclusion of corresponding single-subframe resources may be performed according to the comparison result. For example, the single-subframe resources with a PSSCH-RSRP higher than a predetermined threshold may be excluded, and then X % of the single-subframe resources with the lowest S-RSSI in the remaining resources may be taken as the available candidate single-subframe resources. If $P_{rsvp\_TX}$ is less than a specific value, e.g. 20, and if the UE currently detects the PSCCH transmitted by the second UE on only one carrier, the ratio X % of the finally determined available candidate single-subframe resources to all single-subframe resources within the resource selection window may be greater than the value defined in 3GPP Rel-14, i.e. 20%, thereby reducing the likelihood that different UEs select a same resource. If the UE currently detects the PSCCH transmitted by the second UE on a plurality of carriers, the ratio X % of the available candidate single-subframe resources finally determined by the UE on the carrier c (c=0, 1, 2, ... N−1, N is the number of carriers currently selected by the UE) to all single-subframe resources within the resource selection window may be equal to 20%×Rc, wherein Rc may be equal to 1, 1/N or Pc. The specific value of Rc may be configured by the eNB, preconfigured, or defined by the standard, which may better balance the quality of the available candidate resources and the resource collision probability.

In step S250, the first UE transmits the Physical Sidelink Shared Channel, PSSCH, using at least one of the determined available candidate single-subframe resources. The implementation of Step S250 is substantially the same as that of step S140.

In an exemplary embodiment, step S250 comprises: selecting an initial index m for the modulation coding scheme, MCS; determining an index m' for the effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein the value of d is configured by the base station or preconfigured; and transmitting the PSSCH on the determined available candidate single-subframe resources according to the determined transport block size index and modulation order.

In another exemplary embodiment, step S250 comprises: selecting an initial index m for the modulation coding scheme, MCS; determining a transport block size index according to m and a predetermined mapping rule between MCS indexes and transport block size indexes, and determining a modulation order Q' according to m and a predetermined mapping rule between MCS indexes and modulation orders; and transmitting data on the determined available candidate single-subframe resources according to the determined transport block size index and Q, wherein Q=max (4, Q').

FIG. 3 shows a schematic flow diagram of a data transmission method 300 performed at a first UE according to an exemplary embodiment of the present disclosure. The first UE may communicate directly with the second UE. The first UE and the second UE may be, for example, V2X devices (i.e., V2X UEs) that communication directly with each other through a Sidelink connection. For example, the first UE may be a second type V2X UE that may employ the single-antenna transmission or employ the multi-antenna transmission. Hereafter, the scenario of V2X communication will be taken as an example to explain the exemplary embodiments of the present disclosure. However, it should be understood that the method 300 may be applied to direct communications between any two of UEs.

In step S310, the first UE detects a Physical Sidelink Control CHannel (PSCCH) transmitted by the second UE on one or more carriers. The detected PSCCH may contain information of the priority of data transmission of the second UE and the resource reservation interval of the second UE and etc.

In one exemplary embodiment, the UE may detect the PSCCH transmitted by the second UE on only one carrier. If the UE has only one selectable carrier, the carrier is the current operating carrier of the UE.

Otherwise, the carrier is selected by the UE among a plurality of selectable carriers. An optional selection is that the carrier may be randomly selected by the UE with an equal probability among the plurality of selectable carriers. Another optional selection is that the carrier is randomly selected by the UE according to a carrier-specific probability, Pc, where Pc is the probability of the carrier c being selected by the UE. Preferably, Pc is a function of the channel occupancy ratio (CBRc) on the carrier c and the CBRs on the plurality of selectable carriers, for example, $$P_c = \frac{1/CBR_c}{\sum_{i=0}^{i=N-1} 1/CBR_i},$$

wherein N is the number of the selectable carriers, CBRi is the CBR on the i-th carrier, c=0, 1, 2, . . . N−1. A further optional selection is that the carrier is randomly selected by the UE with an equal probability among m of the plurality of selectable carriers that have lowest CBRs, where 1≤m≤N. The UE determines the value of m according to an indication signaled by the eNB, pre-configuration, or a standard definition.

In one exemplary embodiment, the UE may detect the PSCCH transmitted by the second UE on each of the selectable carriers.

In one exemplary embodiment, the detected PSCCH comprises: an indication for indicating that the second UE employs the multi-antenna transmission; or an indication of compensating the PSSCH-RSRP of the second UE. Alternatively, the detected PSCCH may also comprise a priority offset indication.

In step S320, the first UE compensates a Physical Sidelink Shared Channel's Demodulation Reference Signal Receiving Power, PSSCH-RSRP, of the second UE and adjusts a predetermined threshold according to the detected PSCCH.

In one exemplary embodiment, the first UE may compensate the PSSCH-RSRP of the second UE according to an indication for indicating that the second UE employs the multi-antenna transmission or an indication of compensating the PSSCH-RSRP of the second UE.

In another exemplary embodiment, the first UE may adjust the predetermined threshold according to the priority offset indication.

In step S330, the first UE compares the compensated PSSCH-RSRP with the adjusted predetermined threshold.

Step S330 is similar to steps S131 and S230, and may also be performed in accordance with the resource selection step 2 in the existing standards. The main difference is that: in step 330 the PSSCH-RSRP is compensated and in S330 the predetermined threshold is adjusted. That is, in step 330, PSSCH-RSRP is not only directly compensated but also equivalently compensated by adjusting the predetermined threshold.

In step S340, the first UE determines, on each of the carriers, available candidate single-subframe resources according to the comparison result. Step S340 is similar to steps S132 and S240, and will not be described in detail here.

In an exemplary embodiment, step S340 comprises the following: if $P_{rsvp\_TX}$ is less than a specific value, e.g. 20, and if the UE currently detects the PSCCH transmitted by the second UE on only one carrier, the ratio X % of the finally determined available candidate single-subframe resources to all single-subframe resources within the resource selection window may be greater than the value defined in 3GPP Rel-14, i.e. 20%, thereby reducing the likelihood that different UEs select a same resource. If the UE currently detects the PSCCH transmitted by the second UE on a plurality of carriers, the ratio X % of the available candidate single-subframe resources finally determined by the UE on the carrier c (c=0, 1, 2, . . . N−1, N is the number of carriers currently selected by the UE) to all single-subframe resources within the resource selection window may be equal to 20%×Rc, wherein Rc may be equal to 1, 1/N or Pc. The specific value of Rc may be configured by the eNB, preconfigured, or defined by the standard, which may better balance the quality of the available candidate resources and the resource collision probability.

In step S350, the first UE transmits the Physical Sidelink Shared Channel, PSSCH, using at least one of the determined available candidate single-subframe resources. The implementation of Step S350 is substantially the same as those of steps S140 and S250.

In an exemplary embodiment, step S350 comprises: selecting an initial index m for the modulation coding scheme, MCS; determining an index m' for the effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein the value of d is configured by the base station or preconfigured; and transmitting the PSSCH on the determined available candidate single-subframe resources according to the determined transport block size index and modulation order.

In another exemplary embodiment, step S350 comprises: selecting an initial index m for the modulation coding scheme, MCS; determining a transport block size index according to m and a predetermined mapping rule between MCS indexes and transport block size indexes, and determining a modulation order Q' according to m and a predetermined mapping rule between MCS indexes and modulation orders; and transmitting data on the determined available candidate single-subframe resources according to the determined transport block size index and Q, wherein Q=max (4, Q').

According to the method 100, 200 or 300, the first UE determines, on one or more carriers, whether the second UE employs the multi-antenna transmission according to the detected PSCCH, or acquires an indication of compensating the PSSCH-RSRP. Then, in the case where it is determined that the second UE employs the multi-antenna transmission or the indication of compensating the PSSCH-RSRP is acquired, the PSSCH-RSRP compensation is performed to reduce the likelihood that the first UE selects the resources occupied by the second UE. In addition, when the data transmission of the first UE requires small latency and thus requires a reduced resource selection window, the first UE may adopt multiple means such as employing a more advanced modulation and coding scheme to reduce the required single-subframe resources, increasing the proportion of the potential candidate single-subframe resources, and other things to increase the amount of the available candidate single-subframe resources within the resource selection window, so as to ultimately avoid the possibility of different UEs selecting a same resource. Since the first type V2X UE needs no change, the above method 100 or 200 can improve the performance of the V2X communication system with a small modification to the standards.

In order to facilitate understanding of the present disclosure, hereafter, the above-described technical solutions of the present disclosure will be further described with interactions between devices in connection with specific applications.

Embodiment I

According to the present embodiment, the first UE may determine on one or more carriers whether to compensate or equivalently compensate a PSSCH-RSRP of a second UE transmitting a PSCCH according to the detected PSCCH, and then may determine available candidate single-subframe resources according to the compensated PSSCH-RSRP. Preferably, the following operations are performed only in the case where the UE operates in a particular resource pool configured by the eNB. For example, the particular resource pool may be the transmission resource pool configured for the 3GPP Rel-14 Mode 3 UE.

FIG. 4 shows a schematic flow diagram of a data transmission method 400 performed at a first UE according to an embodiment of the present disclosure.

In step S410, the first UE detects a PSCCH on one or more carriers, and compensates or equivalently compensates the PSSCH-RSRP of the second UE transmitting the PSCCH according to the detection result.

In the present embodiment, the UE may detect the PSCCH transmitted by the second UE on only one carrier. If the UE has only one selectable carrier, the carrier is the current operating carrier of the UE.

Otherwise, the carrier is selected by the UE among a plurality of selectable carriers. According to an implementation of the present embodiment, the carrier may be randomly selected by the UE with an equal probability among the plurality of selectable carriers. According to another implementation of the present embodiment, the carrier is randomly selected by the UE according to a carrier-specific probability, Pc, where Pc is the probability of the carrier c being selected by the UE. Preferably, Pc is a function of the channel occupancy ratio (CBRc) on the carrier c and the CBRs on the plurality of selectable carriers, for example, $$P_c = \frac{1/CBR_c}{\sum_{i=0}^{i=N-1} 1/CBR_i},$$

wherein N is the number of the selectable carriers, CBRi is the CBR on the i-th carrier, c=0, 1, 2, ... N−1. According to a further implementation of the present embodiment, the carrier is randomly selected by the UE with an equal probability among m of the plurality of selectable carriers that have lowest CBRs, where 1≤m≤N. The UE determines the value of m according to an indication signaled by the eNB, pre-configuration, or a standard definition.

In the above manner, the UE can select a carrier with a low CBR with a greater probability.

In the present embodiment, the UE may also detect the PSCCH transmitted by the second UE on each carrier of all selectable carriers.

Whether the UE detects the PSCCH on one carrier or on multiple carriers may be configured by the eNB, preconfigured, defined by standards, or determined by the UE according to a particular rule. This disclosure has no limitation on this regard.

Preferably, in the present embodiment, the bit fields included in the PSCCH and the number of bits included in each bit field are the same as the PSCCH format 1 (SCI 1) defined in the current 3GPP Rel-14.

Preferably, if the second UE employs the multi-antenna transmission, the value of the PSSCH-RSRP of the second UE shall be the average of the PSSCH-RSRP values measured on each of the transmission antenna ports. Preferably, the demodulation reference signal (DMRS) sequence transmitted by the second UE on each of the transmission antenna ports is same, and the cyclic shift of the DMRS on the i-th antenna port is mod(CS0+i*D, 12), wherein CS0 represents the cyclic shift of the DMRS on the 0-th antenna port, and CS0 is determined in a manner as defined in 3GPP Rel-14. The value of D is defined by standards and is configured by the base station or preconfigured, e.g., D=3.

First Approach of PSSCH-RSRP Processing according to the present embodiment:

The detected PSCCH contains an indication for indicating whether the second UE employs the multi-antenna transmission. If the second UE employs the multi-antenna transmission mode, the first UE compensates the PSSCH-RSRP of the second UE, or the first UE compensates the PSSCH-RSRP of the second UE only when the first UE employs the single-antenna transmission mode. For example, if certain bit(s) in the reserved bit field in the detected PSCCH is 1, it indicates that the second UE employs the multi-antenna transmission. If the first UE employs the single-antenna transmission, the first UE compensates 3 dB for the PSSCH-RSRP of the second UE. Alternatively, the detected PSCCH may contain a direct or indirect indication of the number of transmission antenna ports. If the number of transmission ports indicated directly or indirectly is N, the measured PSSCH-RSRP of the second UE should be compensated by $10 \times \log_{10} N_{dB}$.

Preferably, the first UE performs a negative compensation for the PSSCH-RSRP of the second UE, if the second UE employs the single-antenna transmission mode and the first UE employs the multi-antenna transmission mode. For example, if certain bit(s) in the reserved bit field in the detected PSCCH is 0, it indicates that the second UE employs the single-antenna transmission. If the first UE employs the multi-antenna transmission, the first UE compensates −3 dB for the PSSCH-RSRP of the second UE. Alternatively, the detected PSCCH may contain a direct or indirect indication of the number of transmission antenna ports. If the number of transmission ports ind Δ icated directly or indirectly is N, the measured PSSCH-RSRP of the second UE should be compensated by $10 \times \log N_{dB}$.

Second Approach of PSSCH-RSRP Processing according to the present embodiment:

The detected PSCCH contains a PSSCH-RSRP compensation indication indicating whether or not to compensate the PSSCH-RSRP of the second UE. For example, one or two certain bits in the reserved bit field of the PSCCH may be used for the PSSCH-RSRP compensation indication. If 1 bit is used, the value of 0 may indicate no compensation for the PSSCH-RSRP of the second UE or the compensation amount of 0 dB, while the value of 1 may indicate that the measured PSSCH-RSRP should be compensated by 3 dB, or the value of 1 may indicate that the measured PSSCH-RSRP should be compensated by 3 dB when the first UE employs the single-antenna transmission. If two bits are used, the states of 00, 01, 10, 11 may be used to indicate the compensation amounts of e.g. 0 dB, 3 dB, 6 dB, and 9 dB, respectively. Alternatively, when the first UE employs the single-antenna transmission, the states of 00, 01, 10, 11 are used to indicate the compensation amounts of e.g. 0 dB, 3 dB, 6 dB, and 9 dB, respectively.

Third Approach of PSSCH-RSRP Processing according to the present embodiment:

There is an offset A (not less than zero) between the actual priority of the data transmission of the second UE and the priority indicated in the PSCCH that schedules the data transmission. The offset A may be indicated by some certain bits in the PSCCH that schedules the data transmission, configured by the eNB, or preconfigured. In addition, the PSCCH that schedules the data transmission also indicates whether the second UE employs the multi-antenna transmission. If the second UE employs the multi-antenna transmission, the first UE performs an equivalent compensation for the PSSCH-RSRP of the second UE in determining the available candidate resources. Alternatively, the first UE performs an equivalent compensation for the PSSCH-RSRP of the second UE in determining the available candidate resources only when the first UE employs the single-antenna transmission mode. In particular, the predetermined threshold may be adjusted by before the PSSCH-RSRP of the second UE is compared with the adjusted predetermined threshold in determining the available candidate resources. The third approach of PSSCH-RSRP processing may be used in conjunction with the first approach of PSSCH-RSRP processing or the second approach of PSSCH-RSRP processing. In such a case, the predetermined threshold is adjusted by before the compensated PSSCH-RSRP of the second UE is compared with the adjusted predetermined threshold in determining the available candidate resources.

Preferably, if the second UE employs a single-antenna transmission, and the first UE employs the multi-antenna transmission, the first UE performs an equivalent negative compensation for the PSSCH-RSRP of the second UE in determining the available candidate resources. In particular, the predetermined threshold may be adjusted by before the PSSCH-RSRP of the second UE is compared with the adjusted predetermined threshold in determining the available candidate resources.

The third approach of PSSCH-RSRP processing may be used in conjunction with the first approach of PSSCH-RSRP processing or the second approach of PSSCH-RSRP processing. In such a case, the predetermined threshold is adjusted by before the compensated PSSCH-RSRP of the second UE is compared with the adjusted predetermined threshold in determining the available candidate resources.

Fourth Approach of PSSCH-RSRP Processing according to the present embodiment:

The detected PSCCH contains an indication indicating whether the second UE employs the multi-antenna transmission. Assuming that the value of the priority field contained in the PSCCH is $prio_{RX}$ and the priority of the data transmission of the first UE indicated by the high-level instruction information of the first UE is $prio_{TX}$, the first UE compares the PSSCH-RSRP of the second UE with a predetermined threshold $Th_{prio_{TX},prio_{RX}}$ when determining the available candidate resources. If the first and second UEs both employ the single-antenna transmission mode, $Th_{prio_{TX},prio_{RX}}$ represents the i-th SL-ThresPSSCH-RSRP in SL-ThresPSSCH-RSRP-List-r14 defined in the 3GPP standard 36.331 V14.1.0. If the second UE employs the multi-antenna transmission mode and the first UE employs the single-antenna transmission mode $Th_{prio_{TX},prio_{RX}}$ represents the i-th SL-ThresPSSCH-RSRP in SL-ThresPSSCH-RSRP-List-r15-1. If the second UE employs the single-antenna transmission mode and the first UE employs the multi-antenna transmission mode, $Th_{prio_{TX},prio_{RX}}$ represents the i-th SL-ThresPSSCH-RSRP in SL-ThresPSSCH-RSRP-List-r15-2. If the first and second UEs both employ the multi-antenna transmission mode, $Th_{prio_{TX},prio_{RX}}$ represents the i-th SL-ThresPSSCH-RSRP in SL-ThresPSSCH-RSRP-List-r15-3 or $Th_{prio_{TX},prio_{RX}}$ represents the i-th SL-ThresPSSCH-RSRP in SL-ThresPSSCH-RSRP-List-r14. In these cases, i=$prio_{TX}$*8+$prio_{RX}$+1, and SL-ThresPSSCH-RSRP-List-r15-1, SL-ThresPSSCH-RSRP-List-r15-2 and SL-ThresPSSCH-RSRP-List-r15-3 can be redefined in the next version of the 3GPP standard 36.331, and the structures of SL-ThresPSSCH-RSRP-List-r15-1, SL-ThresPSSCH-RSRP-List-r15-2 and SL-ThresPSSCH-RSRP-List-r15-3 are the same as that of SL-ThresPSSCH-RSRP-List-r14. By eNB configuration or preconfiguration, it can ensure that the values of the i-th SL-ThresPSSCH-RSRPs in SL-ThresPSSCH-RSRP-List-r15-1, SL-ThresPS SCH-RSRP-List-r15-2 and SL-ThresPS SCH-RSRP-List-r15-3 and SL-ThresPSSCH-RSRP-List-r14 are not exactly the same. It should be noted that if the second and first UEs both employ the multi-antenna transmission mode, $Th_{prio_{TX},prio_{RX}}$ represents the i-th SL-ThresPSSCH-RSRP in SL-ThresPSSCH-RSRP-List-r14, avoiding the need of additionally defining and configuring SL-ThresPSSCH-RSRP-List-r15-3.

*125If the first or second approach of PSSCH-RSRP Processing is adopted (i.e. the detected PSCCH contains an indication for indicating that the second UE employs the multi-antenna transmission or an indication of compensating the PSSCH-RSRP of the second UE), assuming that the value of the priority field contained in the PSCCH is $prio_{RX}$, and the priority of the data transmission of the first UE indicated by the high-level instruction information of the first UE is $prio_{TX}$, the first UE compares the compensated PSSCH-RSRP with the predetermined threshold $Th_{prio_{TX},prop_{RX}}$ when determining the available candidate resources. $Th_{prio_{TX},prio_{RX}}$ represents the i-th SL-ThresPSSCH-RSRP in SL-ThresPSSCH-RSRP-List-r14 defined in the 3GPP standard 36.331 V14.1.0, wherein i=$prio_{TX}$*8+$prio_{RX}$+1.

Assume that the third approach of PSSCH-RSRP Processing is adopted, and assume that the value of the priority field contained in the PSCCH is $prio_{RX}$, and the priority of the data transmission of the first UE indicated by the high-level instruction information of the first UE is $prio_{TX}$. The first UE compares the PSSCH-RSRP of the second UE with the predetermined threshold adjusted by Δ, i.e. $Th_{prio_{TX},prio_{RX}}-\Delta$, in determining the available candidate resources if the second UE employs the multi-antenna transmission. Alternatively, the first UE compares the PSSCH-RSRP of the second UE with the predetermined threshold adjusted by Δ, i.e., $Th_{prio_{TX},prio_{RX}}-\Delta$, in determining the available candidate resources only if the first UE employs the single-antenna transmission and the second UE employs the multi-antenna transmission. $Th_{prio_{TX},prio_{RX}-\Delta}$ represents the i-th SL-ThresPSSCH-RSRP in SL-ThresPSSCH-RSRP-List-r14 defined in the 3GPP standard 36.331 V14.1.0, wherein i=$prio_{TX}$*8+$prio_{RX}$+1. In this case $prio_{RX}$=$prio'_{RX}$+Δ is preferred for the second UE, where $prio'_{RX}$ represents the actual priority of the data transmission of the second UE. The value of Δ may be defined by the second UE according to the standards, eNB's configuration or pre-configuration. Preferably, in this case, if the first UE employs the single-antenna transmission mode and the second UE employs the multi-antenna transmission mode, the first UE compares the PSSCH-RSRP of the second UE with the predetermined threshold adjusted by Δ i.e., $prio_{RX}$=$prio'_{RX}$+Δ, in determining the available candidate resources.

In other cases, the first UE does not compensate or equivalently compensate the PSSCH-RSRP of the second UE, in other words, the compensation value or the adjusted value for the threshold, Δ is zero. The first UE performs the resource selection step 2 in the same manner as defined by the 3GPP standard Rel-14. That is, assuming that the value of the priority field contained in the PSCCH is $prio_{RX}$ and the priority of the data transmission indicated by the high-level instruction information of the first UE is $prio_{TX}$, the first UE compares the PSSCH-RSRP of the second UE with a predetermined threshold $Th_{prio_{TX},prio_{RX}}$ when determining the available candidate resources. $Th_{prio_{TX},prio_{RX}}$ represents the i-th SL-ThresPSSCH-RSRP in SL-ThresPSSCH-RSRP-List-r14 defined in the 3GPP standard 36.331 V14.1.0, wherein i=$prio_{TX}$*8+$prio_{RX}$+1.

In step S420, the first UE determines the available candidate single-subframe resources on each carrier according to the compensation or equivalent compensation result obtained in step S410.

The first UE may continue to perform the resource selection step 2 in the manner defined in 3GPP Rel-14 on each carrier, and then perform the resource selection step 3.

In step S430, the first UE selects one of the available candidate single-subframe resources on all the carriers as the transmission resource. For example, the first UE may randomly select one of the available candidate single-subframe resources on all the carriers as the transmission resource.

Embodiment II

According to the present embodiment, the first UE may compensate or equivalently compensate the PSSCH-RSRP of the second UE on one or more carriers according to the detected PSCCH. The approach of the first UE determining whether or not to perform the PSSCH-RSRP compensation or equivalent compensation and the approach of performing the compensation or equivalent compensation are the same as step S410, and will not be described again. Alternatively, the first UE always performs the resource selection step 2 in accordance with the PSSCH-RSRP of the second UE, i.e., no compensation for the PSSCH-RSRP of the second UE will be performed in any case. For the first UE that transmits data traffic requiring small latency, the proportion of the ultimately remaining potential candidate single-subframe resources ultimately left should be increased, so as to reduce the resource collision probability. Preferably, the following operations are performed only in the case where the UE operates in a particular resource pool configured by the eNB. For example, the particular resource pool may be the transmission resource pool configured for the 3GPP Rel-14 Mode 3 UE.

FIG. 5 shows a schematic flow diagram of a data transmission method 500 performed at a first UE according to an embodiment of the present disclosure.

In step S510, the first UE detects the PSCCH transmitted by the second UE on one or more carriers, and determines the PSSCH-RSRP of the second UE.

The approach of the UE determining the one or more carriers is the same as that of the first embodiment, and will not be described again.

The first UE determines whether or not to perform the compensation or equivalent compensation for the PSSCH-RSRP of the second UE.

If the first UE needs to compensate or equivalently compensate the PSSCH-RSRP of the second UE, the operation mode of the first UE is the same as that in step S410 and will not be described here. Otherwise, the first UE always performs the resource selection step 2 according to the PSSCH-RSRP of the second UE.

In step S520, the first UE determines the available candidate single-subframe resources on each carrier, and selects one of the available candidate single-subframe resources on all carriers as the transmission resource.

In the present embodiment, if the first UE always determines the available candidate resources according to the PSSCH-RSRP of the second UE or if the first UE adopts the first or second approach of PSSCH-RSRP processing in the embodiment I, assuming that the value of the priority field contained in the detected PSCCH is $prio_{RX}$ and the priority of the data transmission indicated by the high-level instruction information of the first UE is $prio_{TX}$, the first UE compares the compensated PSSCH-RSRP of the second UE with the predetermined threshold $Th_{prio_{TX},prio_{RX}}$ in determining the available candidate resources when the condition for compensating the PSSCH-RSRP of the second UE in the first or second approach of PSSCH-RSRP Processing is satisfied. Then, the first UE excludes the single-subframe resources with a PSSCH-RSRP higher than the predetermined threshold from the set S. If the remaining resources in the set S are less than X %, the first UE will increase $Th_{prio_{TX},prio_{RX}}$ by Y dB and then repeat the above comparison operation, until the remaining resources in the set S are equal or greater than X % or the increment of $Th_{prio_{TX},prio_{RX}}$ is greater than (z high) dB.

In the present embodiment, if the first UE adopts the third approach of PSSCH-RSRP Processing in the embodiment I, assuming that the value of the priority field contained in the detected PSCCH is $prio_{RX}$ and the priority of the data transmission indicated by the high-level instruction information of the first UE is $prio_{TX}$, the first UE compares the PSSCH-RSRP of the second UE with the adjusted predetermined threshold $Th_{prio_{TX},prio_{RX}-\Delta}$ in determining the available candidate resources when the condition for equivalently compensating the PSSCH-RSRP of the second UE in the third approach of PSSCH-RSRP processing is satisfied. $Th_{prio_{TX},prio_{RX}-\Delta}$ represents the i-th SL-ThresPSSCH-RSRP in SL-ThresPSSCH-RSRP-List-r14 defined in the 3GPP standard 36.331 V14.1.0, wherein i=$prio_{TX}$*8+($prio_{RX}-\Delta$)+1. If the remaining resources in the set S are less than X %, the first UE will increase $Th_{prio_{TX},prio_{RX}-\Delta}$ is greater than (z high) dB. Y dB and then repeat the above comparison operation, until the remaining resources in the set S are equal or greater than X % or the increment of $Th_{prio_{TX},prio_{RX}-\Delta}$ is greater than (z high) dB. Y is a specific value defined by the standards, configured by eNB or preconfigured. For example, if the value of $P_{rsvp\_TX}$ is less than 20, Y is 2 dB or 1 dB. z is a specific value defined by the standards, configured by eNB or preconfigured. For example, z may be equal to 3.

In the present embodiment, if the first UE adopts the third approach of PSSCH-RSRP Processing in the embodiment I, assuming that the value of the priority field contained in the detected PSCCH is $prio_{RX}$ and the priority of the data transmission indicated by the high-level instruction information of the first UE is $prio_{TX}$, the first UE compares the PSSCH-RSRP of the second UE with the predetermined threshold adjusted by $\Delta$, i.e. $Th_{prio_{TX}+\Delta,prio_{RX}}$, in determining the available candidate resources when the condition for performing equivalent negative compensation for the PSSCH-RSRP of the second UE in the third approach of PSSCH-RSRP processing is satisfied. $Th_{prio_{TX}+\Delta,prio_{RX}}$ represents the i-th SL-ThresPSSCH-RSRP in SL-ThresPSSCH-RSRP-List-r14 defined in the 3GPP standard 36.331 V14.1.0, wherein i=($prio_{TX}+\Delta$)*8+$prio_{RX}$+1. If the remaining resources in the set S are less than X %, the first UE will increase $Th_{prio_{TX}+\Delta,prio_{RX}}$ by Y dB and then repeat the above comparison operation, until the remaining resources in the set S are equal or greater than X % or the increment of $Th_{prio_{TX}+\Delta,prio_{RX}}$ is greater than (z high) dB. Y is a specific value defined by the standards, configured by eNB or preconfigured. For example, if the value of $P_{rsvp\_TX}$ is less than 20, Y is 2 dB or 1 dB z is a specific value defined by the standards, configured by eNB or preconfigured. For example, z may be equal to 3.

In the present embodiment, if the first UE adopts the fourth approach of PSSCH-RSRP Processing in the embodiment I, assuming that the value of the priority field contained in the detected PSCCH is $prio_{RX}$ and the priority of the data transmission indicated by the high-level instruction information of the first UE is $prio_{TX}$, the first UE compares the PSSCH-RSRP of the second UE with the predetermined threshold $Th_{prio_{TX},prio_{RX}}$ in determining the available candidate resources. According to the rule defined in the fourth approach of PSSCH-RSRP processing in embodiment I and the transmission modes of the first and second UEs, $Th_{prio_{TX},prio_{RX}}$ may represent the i-th SL-ThresPSSCH-RSRP in SL-ThresPSSCH-RSRP-List-r15-1, SL-ThresPSSCH-RSRP-List-r15-2, SL-ThresPSSCH-RSRP-List-r15-3 or SL-ThresPSSCH-RSRP-List-r14, wherein i= $prio_{TX}$*8+$prio_{RX}$+1. If the remaining resources in the set S are less than X %, the first UE will increase $Th_{prio_{TX},prio_{RX}}$ by Y dB and then repeat the above comparison operation, until the remaining resources in the set S are equal or greater than X % or the increment of $Th_{prio_{TX}+\Delta,prio_{RX}}$ is greater than (z high) dB. Y is a specific value defined by the standards, configured by eNB or preconfigured. For example, if the value of $P_{rsvp\_TX}$ is less than 20, Y is 2 dB or 1 dB. z is a specific value defined by the standards, configured by eNB or preconfigured. For example, z may be equal to 3.

Preferably, it is assumed that the upper layer indication information of the first UE includes a resource reservation interval $P_{rsvp\_TX}$ assumed when determining the available candidate resources. If the value of $P_{rsvp\_TX}$ is less than 20, and the UE currently detects the PSCCH transmitted by the second UE on only one carrier, the ratio X % of the finally determined available candidate single-subframe resources to all single-subframe resources within the resource selection window may be greater than the value defined in 3GPP Rel-14, i.e. 20%. For example, X % may be 30% or 40%. Alternatively, X % may be 20/$P_{rsvp\_TX}$×20% Alternatively, X % may be a value configured by eNB or a preconfigured value. In this way, the likelihood of selecting the same resource by different UEs can be reduced. If the UE currently detects the PSCCH transmitted by the second UE on a plurality of carriers, the ratio X % of the available candidate single-subframe resources finally determined by the UE on the carrier c (c=0, 1, 2, . . . N−1, N is the number of carriers currently selected by the UE) to all single-subframe resources within the resource selection window may be equal to 20%×Rc, wherein Rc may be equal to 1, 1/N or Pc. The specific value of Rc may be configured by the eNB, preconfigured, or defined by the standard, which may better balance the quality of the available candidate resources and the resource collision probability.

The first UE shall further perform the resource selection step 3, and the ratio of the available candidate single-subframe resources finally determined on each carrier shall be not less than min{X %, X'%}, wherein X'% is the proportion of the remaining single-subframe resources after the resource selection step 2 is performed.

In step S530, the first UE transmits the PSSCH on the selected single-subframe resource according to the determined modulation and coding scheme.

Embodiment III

According to the present embodiment, the step S530 in Embodiment II may further comprise determining a transport block size index (ITBS) and a modulation order so as to ensure that the MCS or modulation order of the first UE with $P_{rsvp\_TX}$ less than 20 is higher than that of the first UE with $P_{rsvp\_TX}$ equal or greater than 20 in the same condition, thereby increasing the number of the single-subframe resources in the resource selection window and reducing the resource collision probability between different UEs. Preferably, the following operations are performed only in the case where the UE operates in a particular resource pool configured by the eNB. For example, the particular resource pool may be the transmission resource pool configured for the 3GPP Rel-14 Mode 3 UE.

Two exemplary implementations of the transport block size index (ITBS) and modulation order are described in detail below.

In the first implementation, the first UE selects an initial index m for the MCS within the MCS range determined by the existing standards, then determines an index m' for the effective MCS based on min(m+d, 28) or min(m+d, 31), determines a transport block size index according to m' and a predetermined mapping rule between MCS indexes (e.g., as defined by the current standards) and transport block size indexes, and determines a modulation order according to m' and a predetermined mapping rule between MCS indexes and modulation orders, wherein the value of d is configured by the base station or preconfigured.

In the second implementation, the first UE selects an initial index m for the MCS within the MCS range determined by the existing standards, then determines a transport block size index according to m and a predetermined mapping rule between MCS indexes (e.g., as defined by the current standards) and transport block size indexes (ITBS), and determines a modulation order Q' according to m and a predetermined mapping rule between MCS indexes and modulation orders. Finally, the first UE transmits data on the selected single-subframe resource according to the determined ITBS and Q, wherein Q=max (4, Q').

The structure of the UE according to an embodiment of the present disclosure will be described below with reference to FIG. 6. FIG. 6 shows a schematic diagram of the structure of the UE 600 according to an embodiment of the present disclosure. The UE 600 may communicate directly with a second UE. Both of the UE 600 and the second UE, for example, may be V2X devices that communicate directly with each other through a Sidelink connection. For example, the UE 600 may be a first UE as described above (either a second type V2X UE that supports the single-antenna transmission, or a second type V2X UE supports the multi-antenna transmission). The second UE may be a second type V2X UE that supports the multi-antenna transmission. The UE 600 may perform the method described with reference to FIGS. 1-5.

As shown in FIG. 6, the UE 600 includes: a transceiver 601 for external communication; a processing unit or processor 603, which may be a single unit or a combination of multiple units for performing various steps of the method; a memory 605 storing computer-executable instructions thereon, which, when executed by the processor 603, cause the UE 600 to perform the following operations corresponding to the method 100: detecting, on one or more carriers, a Physical Sidelink Control Channel, PSCCH, transmitted by a second UE; compensating, on each of the carriers, a Physical Sidelink Shared Channel's Demodulation Reference Signal Receiving Power, PSSCH-RSRP, of the second UE, according to the detected PSCCH; determining, on each of the carrier, available candidate single-subframe resources according to the compensated PSSCH-RSRP; and, transmitting, by the transceiver 601, the Physical Sidelink Shared Channel, PSSCH, using at least one of the determined available candidate single-subframe resources on all of the carriers.

In one exemplary embodiment, the UE may detect the PSCCH transmitted by the second UE on only one carrier. If the UE has only one selectable carrier, the carrier is the current operating carrier of the UE.

Otherwise, the carrier is selected by the UE among a plurality of selectable carriers. An optional selection is that the carrier may be randomly selected by the UE with an equal probability among the plurality of selectable carriers. Another optional selection is that the carrier is randomly selected by the UE according to a carrier-specific probability, Pc, where Pc is the probability of the carrier c being selected by the UE. Preferably, Pc is a function of the channel occupancy ratio (CBRc) on the carrier c and the CBRs on the plurality of selectable carriers, for example, $$P_c = \frac{1/CBR_c}{\sum_{i=0}^{i=N-1} 1/CBR_i},$$

wherein N is the number of the selectable carriers, CBRi is the CBR on the i-th carrier, c=0, 1, 2, ... N−1. A further optional selection is that the carrier is randomly selected by the UE with an equal probability among m of the plurality of selectable carriers that have lowest CBRs, where 1≤m≤N. The UE determines the value of m according to an indication signaled by the eNB, pre-configuration, or a standard definition.

In one exemplary embodiment, the UE may detect the PSCCH transmitted by the second UE on each of the selectable carriers.

In one exemplary embodiment, the detected PSCCH comprises at least one of the following: an indication for indicating that the second UE employs the multi-antenna transmission; or an indication of compensating the PSSCH-RSRP of the second UE.

In one exemplary embodiment, determining the available candidate single-subframe resources according to the comparison result comprises: if the UE currently detects the PSCCH transmitted by the second UE on only one carrier, determining more than 20% of the single-subframe resources within the resource selection window as the available candidate single-subframe resources; and if the UE currently detects the PSCCH transmitted by the second UE on a plurality of carriers, the ratio X % of the available candidate single-subframe resources finally determined by the UE on the carrier c to all single-subframe resources within the resource selection window being equal to 20%× Rc, wherein Rc is equal to 1, 1/N or Pc, and c=0, 1, 2, ... N−1.

In one exemplary embodiment, transmitting the Physical Sidelink Shared Channel, PSSCH, using the determined available candidate single-subframe resources comprises: selecting an initial index m for the modulation coding scheme, MCS; determining an index m' for the effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein the value of d is configured by the base station or preconfigured; and transmitting the PSSCH on the determined available candidate single-subframe resources according to the determined transport block size index and modulation order.

In one exemplary embodiment, transmitting the Physical Sidelink Shared Channel, PSSCH, using the determined available candidate single-subframe resources on all of the carriers comprises: selecting an initial index m for the modulation coding scheme, MCS; determining a transport block size index according to m and a predetermined mapping rule between MCS indexes and transport block size indexes, and determining a modulation order Q' according to m and a predetermined mapping rule between MCS indexes and modulation orders; and transmitting data on the determined available candidate single-subframe resources according to the determined transport block size index and Q, wherein Q=max (4, Q').

In one exemplary embodiment, determining the available candidate single-subframe resources according to the compensated PSSCH-RSRP comprises: comparing the compensated PSSCH-RSRP with a predetermined threshold; and determining the candidate single-subframe resources according to the comparison result.

The memory 605 may also store computer-executable instructions that, when executed by the processor 603, cause the UE 600 to perform the following operations corresponding to the method 200: detecting, on one or more carriers, a Physical Sidelink Control Channel, PSCCH, transmitted by a second UE; adjusting, on each of the carriers, a predetermined threshold according to the detected PSCCH and comparing PSSCH-RSRP with the adjusted predetermined threshold; determining available candidate single-subframe resources according to the comparison result; and transmitting, by the transceiver 601, the Physical Sidelink Shared Channel, PSSCH, using at least one of the available candidate single-subframe resources determined on all of the carriers.

In one exemplary embodiment, the detected PSCCH comprises a priority offset indication for indicating an offset between the actual priority of the data transmission of the second UE and the transmitted priority of the data to be scheduled of the second UE. In addition, adjusting the predetermined threshold according to the detected PSCCH comprises adjusting the predetermined threshold according to the priority offset indication.

In one exemplary embodiment, determining the available candidate single-subframe resources according to the comparison result comprises: if the UE currently detects the PSCCH transmitted by the second UE on only one carrier, determining more than 20% of the single-subframe resources within the resource selection window as the available candidate single-subframe resources. If the UE currently detects the PSCCH transmitted by the second UE on a plurality of carriers, the ratio X % of the available candidate single-subframe resources finally determined by the UE on the carrier c to all single-subframe resources within the resource selection window being equal to 20%× Rc, wherein Rc is equal to 1, 1/N or Pc, and c=0, 1, 2, ... N−1.

In one exemplary embodiment, transmitting the Physical Sidelink Shared Channel, PSSCH, using at least one of the available candidate single-subframe resources determined on all of the carriers comprises: selecting an initial index m for the modulation coding scheme, MCS; determining an index m' for the effective MCS based on min(m+d, 28) or min(m+d, 31), determining a transport block size index according to m' and a predetermined mapping rule between MCS indexes and transport block size indexes, and determining a modulation order according to m' and a predetermined mapping rule between MCS indexes and modulation orders, wherein the value of d is configured by the base station or preconfigured; and transmitting the PSSCH on the determined available candidate single-subframe resources according to the determined transport block size index and modulation order.

In one exemplary embodiment, transmitting the Physical Sidelink Shared Channel, PSSCH, using the determined available candidate single-subframe resources comprises: selecting an initial index m for the modulation coding scheme, MCS; determining a transport block size index according to m and a predetermined mapping rule between MCS indexes and transport block size indexes, and determining a modulation order Q' according to m and a predetermined mapping rule between MCS indexes and modulation orders; and transmitting data on the determined available candidate single-subframe resources according to the determined transport block size index and Q, wherein Q=max (4, Q').

The memory 605 may also store computer-executable instructions that, when executed by the processor 603, cause the UE 600 to perform the following operations corresponding to the method 300: detecting, on one or more carriers, a Physical Sidelink Control Channel, PSCCH, transmitted by a second UE; on each of the carriers, compensating a Physical Sidelink Shared Channel's Demodulation Reference Signal Receiving Power, PSSCH-RSRP, of the second UE and adjusting a predetermined threshold, according to the detected PSCCH; comparing the compensated PSSCH-RSRP with the adjusted predetermined threshold; determining available candidate single-subframe resources according to the comparison result; and transmitting, by the transceiver 601, the Physical Sidelink Shared Channel, PSSCH, using at least one of the available candidate single-subframe resources determined on all of the carriers.

In one exemplary embodiment, compensating the PSSCH-RSRP according to the detected PSCCH comprises compensating the PSSCH-RSRP according to at least one of the following: an indication for indicating that the second UE employs the multi-antenna transmission; or an indication of compensating the PSSCH-RSRP of the second UE.

In one exemplary embodiment, the detected PSCCH comprises a priority offset indication for indicating an offset between the actual priority of the data transmission of the second UE and the transmitted priority of the data to be scheduled of the second UE; and adjusting the predetermined threshold according to the detected PSCCH comprises adjusting the predetermined threshold according to the priority offset indication.

The present disclosure also provides at least one computer storage medium in the form of nonvolatile or volatile memory, such as electrically erasable programmable read-only memory (EEPROM), flash memory, and hard disk drivers. The computer-executable instructions, when executed by the processor 603, cause the UE 600 to perform, for example, the actions described above in connection with FIGS. 1-5.

The processor may be a single CPU (a central processor), but may also comprise two or more processors. For example, the processor may comprise a general purpose microprocessor; an instruction set processor and/or a related chip set and/or a dedicated microprocessor (e.g., an application specific integrated circuit (ASIC)). The processor may also comprise onboard memory for cache purposes. For example, the computer storage medium may be flash memory, random access memory (RAM), read only memory (ROM), or EEPROM.

According to the above-described embodiments of the present disclosure, the present disclosure provides a new UE (as described above, also referred to as a second type V2X UE, which supports both the single-antenna transmission and the multi-antenna transmission) with respect to the first type V2X UE, as well as a method, performed on the new UE, for performing direct communication with the second type V2X UE employing the multi-antenna transmission, which can improve the performance of the V2X communication system with a small modification to the standards. In particular, the new UE determines that a second type V2X UE employs the multi-antenna transmission according to the detected PSCCH of the UE, and then compensates or equivalently compensates the PSSCH-RSRP of the UE (e.g. adjusts a predetermined threshold for comparison with the PSSCH-RSRP when determining available candidate resources), thereby reducing the likelihood that the transmission resources for the second type V2X UE employing the multi-antenna transmission are preempted. In addition, when the data transmission of the new UE requires small latency and thus requires a reduced resource selection window, the new UE may adopt a more advanced modulation and coding scheme to reduce the required single-subframe resources, adopt means such as increasing the proportion of the potential candidate single-subframe resources to increase the amount of the available candidate single-subframe resources within the resource selection window, so as to avoid the possibility of different UEs selecting a same resource.

It will be understood by those skilled in the art that the present disclosure comprise apparatus for performing one or more of the operations described in this disclosure. These apparatus may be specifically designed and manufactured for the intended purpose, or may also comprise known devices of a general purpose computer. These apparatus have computer programs stored therein, which are selectively activated or reconstructed. Such computer programs may be stored in a device (e.g., a computer) readable medium or stored in any type of medium suitable for storing electronic instructions and coupled to a bus. The computer readable medium includes, but not limited to, any disk (including floppy disks, hard disks, optical disks, CD-ROM, and magneto-optical disks), ROM (Read-Only Memory), RAM (Random Access Memory), EPROM (Erasable Programmable Read-Only Memory, Erasable programmable read-only memory), EEPROM (Electrically Erasable Programmable Read-Only Memory), flash memory, magnetic card or light card. That is, the readable medium includes any medium that can store or transmit information in a device (e.g. a computer) readable form.

It will be understood by those skilled in the art that each of the blocks and/or combination of blocks in the structure diagrams and/or block diagrams and/or flow diagrams may be implemented by computer program instructions. It will be appreciated by those skilled in the art that these computer program instructions may be provided to a processor of a general purpose computer, a specialized computer, or other processor capable of programing a data processing method to execute, so as to perform the solutions specified in the block(s) in the structure diagrams and/or block diagrams and/or flow diagrams disclosed by the present disclosure.

It will be understood by those skilled in the art that steps, measures and schemes in various operations, methods and processes discussed in this disclosure may be alternated, modified, combined, or deleted. In addition, other steps, measures and schemes in various operations, methods and processes discussed in this disclosure may be alternated, modified, rearrange, decomposed, combined, or deleted. Further, the prior art with steps, measures and schemes in various operations, methods and processes discussed in this disclosure may be alternated, modified, rearranged, decomposed, combined or deleted.

The foregoing describes merely part of the embodiments of the present disclosure. It should be noted that several modifications and improvements may be made by those skilled in the art without departing from the principles of the present disclosure and thus such modifications and improvements shall be regarded as falling in the scope of the present disclosure.

The invention claimed is:

1. A data transmission method performed at a first user equipment, UE, comprising:
    detecting, on at least one carrier, a Physical Sidelink Control Channel (PSCCH) including at least one of an indication for indicating that a multi-antenna transmission is employed at a second UE or an indication of compensating a Physical Sidelink Shared Channel Demodulation Reference Signal Receiving Power (PSSCH-RSRP) of the second UE, transmitted by the second UE;
    estimating, on each of the at least one carrier, the PSSCH-RSRP of the second UE, according to the detected PSCCH;
    compensating, on each of the at least one carrier, the estimated PSSCH-RSRP of the second UE, according to the detected PSCCH;
    determining, on each of the at least one carrier, available candidate single-subframe resources according to the compensated PSSCH-RSRP; and
    transmitting a Physical Sidelink Shared Channel (PSSCH) using at least one of the determined available candidate single-subframe resources on the at least one carrier.

2. The data transmission method of claim 1, wherein determining the available candidate single-subframe resources according to the compensated PSSCH-RSRP comprises:
    if the first UE currently detects the PSCCH transmitted by the second UE on only one carrier, determining more than 20% of single-subframe resources within a resource selection window as the available candidate single-subframe resources; and
    if the first UE currently detects the PSCCH transmitted by the second UE on a plurality of carriers, determining 20%×Rc of the single-subframe resources within the resource selection window as the available candidate single-subframe resources, where Rc is equal to 1, 1/N or Pc, N is a number of carriers currently selected by the first UE, $$P_c = \frac{1/CBR_c}{\sum_{i=0}^{i=N-1} 1/CBR_i},$$

$P_c$ is a probability of a carrier c being selected by the first UE, $CBR_c$ is a channel occupancy ratio on the carrier c, and CBRi is a CBR on an i-th carrier.

3. The data transmission method of claim 1, wherein transmitting the PSSCH using the determined available candidate single-subframe resources comprises:
    selecting an initial index m for a modulation coding scheme (MCS);
    determining an index m' for an effective MCS based on min(m+d, 28) or min(m+d, 31), determining a transport block size index according to m' and a first predetermined mapping rule between MCS indexes and transport block size indexes, and determining a modulation order according to m' and a second predetermined mapping rule between the MCS indexes and modulation orders, wherein a value of d is configured by a base station or preconfigured; and
    transmitting the PSSCH on the determined available candidate single-subframe resources according to the determined transport block size index and the determined modulation order.

4. The data transmission method of claim 1, wherein transmitting the PSSCH using the determined available candidate single-subframe resources comprises:
    selecting an initial index m for a modulation coding scheme (MCS);
    determining a transport block size index according to m and a first predetermined mapping rule between MCS indexes and transport block size indexes, and determining a modulation order Q' according to m and a second predetermined mapping rule between the MCS indexes and modulation orders; and
    transmitting data on the determined available candidate single-subframe resources according to the determined transport block size index and Q, wherein Q=max (4, Q').

5. A data transmission method performed at a first user equipment, UE, comprising:
    detecting, on at least one carrier, a Physical Sidelink Control Channel (PSCCH) transmitted by a second UE;
    obtaining a priority offset information for indicating an offset between actual priority of data transmission of the second UE and scheduled priority of data transmission of the second UE, from the detected PSCCH;
    adjusting, on each of the at least one carrier, a predetermined threshold based on the priority offset information;
    comparing a Physical Sidelink Shared Channel Demodulation Reference Signal Receiving Power (PSSCH-RSRP) of the second UE with the adjusted predetermined threshold;
    determining available candidate single-subframe resources according to a result of the comparison; and
    transmitting a Physical Sidelink Shared Channel (PSSCH) using at least one of the determined available candidate single-subframe resources on the at least one carrier.

6. The data transmission method of claim 5, wherein determining the available candidate single-subframe resources according to the result of the comparison comprises:
    if the first UE currently detects the PSCCH transmitted by the second UE on only one carrier, determining more than 20% of single-subframe resources within a resource selection window as the available candidate single-subframe resources; and
    if the first UE currently detects the PSCCH transmitted by the second UE on a plurality of carriers, determining 20%×Rc of the single-subframe resources within the resource selection window as the available candidate single-subframe resources, where Rc is equal to 1, 1/N or Pc, N is a number of carriers currently selected by the first UE, $$P_c = \frac{1/CBR_c}{\sum_{i=0}^{i=N-1} 1/CBR_i},$$

$P_c$ is a probability of a carrier c being selected by the first UE, $CBR_c$ is a channel occupancy ratio on the carrier c, and CBRi is a CBR on an i-th carrier.

7. The data transmission method of claim 5, wherein transmitting the Physical Sidelink Shared Channel, PSSCH, using the determined available candidate single-subframe resources comprises:
   selecting an initial index m for a modulation coding scheme (MCS);
   determining an index m' for an effective MCS based on min(m+d, 28) or min(m+d, 31), determining a transport block size index according to m' and a first predetermined mapping rule between MCS indexes and transport block size indexes, and determining a modulation order according to m' and a second predetermined mapping rule between the MCS indexes and modulation orders, wherein a value of d is configured by a base station or preconfigured; and
   transmitting the PSSCH on the determined available candidate single-subframe resources according to the determined transport block size index and the determined modulation order.

8. The data transmission method of claim 5, wherein transmitting the PSSCH using the determined available candidate single-subframe resources comprises:
   selecting an initial index m for a modulation coding scheme (MCS);
   determining a transport block size index according to m and a first predetermined mapping rule between MCS indexes and transport block size indexes, and determining a modulation order Q' according to m and a second predetermined mapping rule between the MCS indexes and modulation orders; and
   transmitting data on the determined available candidate single-subframe resources according to the determined transport block size index and Q, wherein Q=max (4, Q').

9. A first user equipment, UE, comprising:
   a transceiver; and
   a processor configured to:
   detect, on at least one carrier, a Physical Sidelink Control Channel (PSCCH) including at least one of an indication for indicating that a multi-antenna transmission is employed at a second UE or an indication of compensating a Physical Sidelink Shared Channel Demodulation Reference Signal Receiving Power (PSSCH-RSRP) of the second UE, transmitted by the second UE;
   estimate, on each of the at least one carrier, the PSSCH-RSRP of the second UE, according to the detected PSCCH;
   compensate, on each of the at least one carrier, the estimated PSSCH-RSRP of the second UE, according to the detected PSCCH;
   determine, on each of the at least one carrier, available candidate single-subframe resources according to the compensated PSSCH-RSRP; and
   transmit, via the transceiver, a Physical Sidelink Shared Channel (PSSCH) using at least one of the determined available candidate single-subframe resources on the at least one carrier.

10. A non-transitory computer storage medium storing computer-executable instructions that, when executed by a processor of a first user equipment (UE), cause the first UE to:
    detect, on at least one carrier, a Physical Sidelink Control Channel (PSCCH) including at least one of an indication for indicating that a multi-antenna transmission is employed at a second UE or an indication of compensating a Physical Sidelink Shared Channel Demodulation Reference Signal Receiving Power (PSSCH-RSRP) of the second UE, transmitted by the second UE;
    estimate, on each of the at least one carrier, the PSSCH-RSRP of the second UE, according to the detected PSCCH;
    compensate, on each of the at least one carrier, the estimated PSSCH-RSRP of the second UE, according to the detected PSCCH;
    determine, on each of the at least one carder, available candidate single-subframe resources according to the compensated PSSCH-RSRP; and
    transmit a Physical Sidelink Shared Channel (PSSCH) using at least one of the determined available candidate single-subframe resources on the at least one carrier.

11. A first user equipment (UE) comprising:
    a transceiver; and
    a processor configured to:
    detect, on at least one carrier, a Physical Sidelink Control Channel (PSCCH) transmitted by a second UE;
    obtain priority offset information for indicating an offset between actual priority of data transmission of the second UE and scheduled priority of data transmission of the second UE, from the detected PSCCH;
    adjust, on each of the at least one carrier, a predetermined threshold based on the priority offset information;
    compare a Physical Sidelink Shared Channel Demodulation Reference Signal Receiving Power (PSSCH-RSRP) of the second UE with the adjusted predetermined threshold;
    determine available candidate single-subframe resources according to a result of the comparison; and
    transmit, via the transceiver, a Physical Sidelink Shared Channel (PSSCH) using at least one of the determined available candidate single-subframe resources on the at least one carrier.

* * * * *